UNITED STATES PATENT OFFICE.

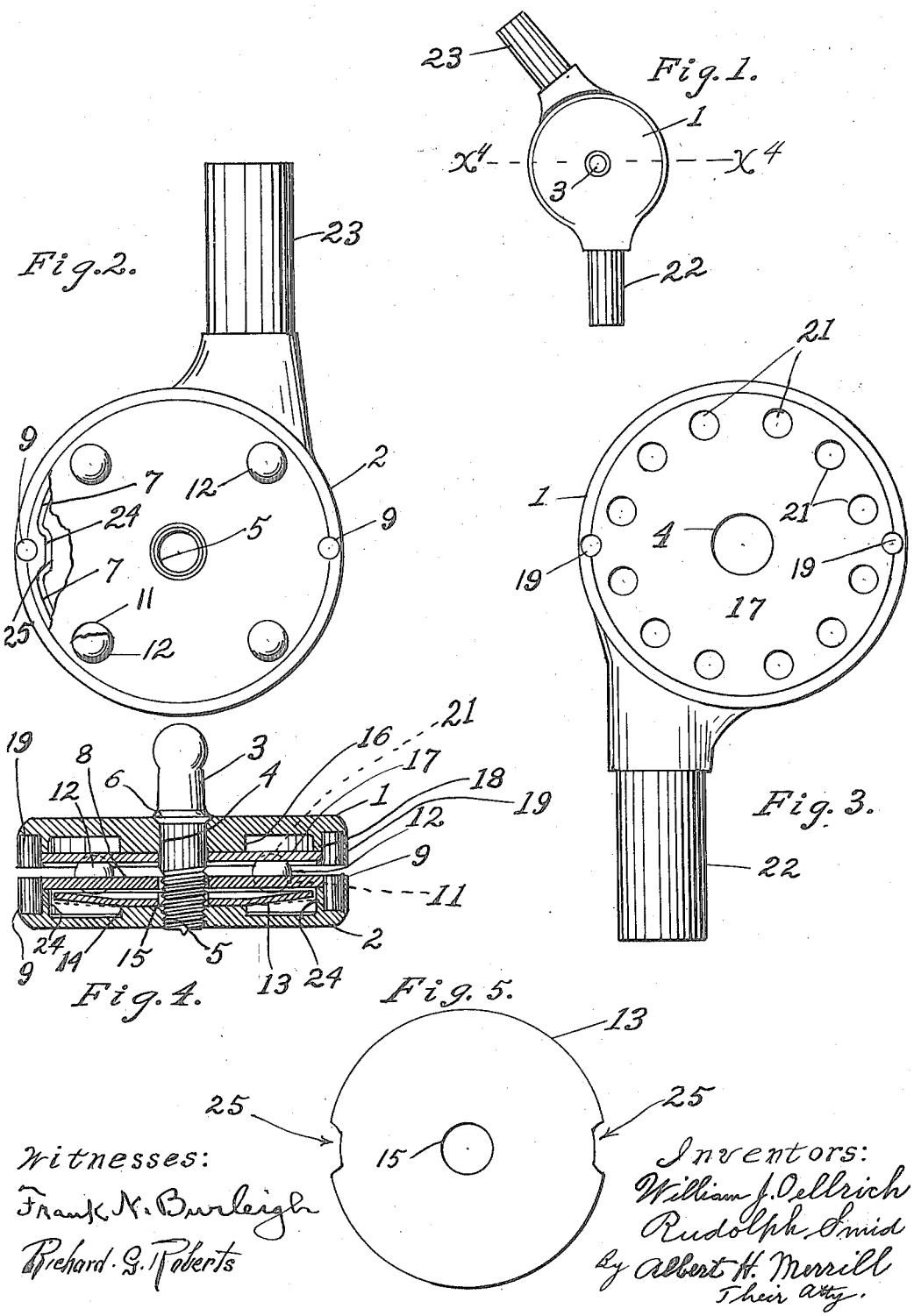

WILLIAM J. OELLRICH AND RUDOLPH SMID, OF LOS ANGELES, CALIFORNIA.

HINGE.

1,180,669.  Specification of Letters Patent.  Patented Apr. 25, 1916.

Application filed November 12, 1910, Serial No. 591,964. Renewed February 9, 1916. Serial No. 77,298.

*To all whom it may concern:*

Be it known that we, WILLIAM J. OELLRICH, a citizen of the United States, and RUDOLPH SMID, a subject of the Emperor of Austria-Hungary, both residents of Los Angeles, California, have invented a new and useful Hinge, of which the following is a specification.

This invention relates to a hinge adapted to hold the members hinged together in a yielding angular adjustment with respect to each other.

Objects of this invention are to simplify the construction, lower the cost and increase the reliability and generally improve hinges of the above stated character.

Our newly invented hinge, while especially adapted to the support and angular adjustment of the wind-shields of automobiles, may be used to advantage in various other situations where a friction hinge or yieldingly adjustable hinge is desired.

Referring to the drawings, Figure 1, is a side view of the complete hinge on a smaller scale than the other views; Fig. 2 is a view of the inner face of one of the main sections of the hinge; Fig. 3 is a face view of the other section; Fig. 4 is a central cross section on line $x^4$ of Fig. 1; Fig. 5 is a plan view of the spring plate.

Referring in detail to the drawings, the hinge comprises a main upper (as seen in Fig. 4) section 1 and lower section 2, clamped together, or nearly so, by means of a screw bolt 3 which extends through a smooth bore or hole 4 with which the upper section 1 is provided, said screw having a threaded portion which screws into a threaded bore 5 in the lower section of the hinge. Said screw bolt 3 is furnished with a circumferential bead 6 to provide for clamping the two members of the hinge together.

The lower member 1 is provided near its face with an annular shoulder 7 upon which is mounted the lower face plate 8 secured in place by the rivets 9 and provided with a circularly arranged series of containers 11 consisting of holes through said plate. In each container 11 is a ball 12 desirably a little less in diameter than said container. Said balls 12 rest upon resilient means tending to force them toward the upper member 1 of the hinge, said means desirably consisting of a spring washer 13 the central portion of which rests upon a rise 14 and is provided with an aperture 15 through which the bolt 3 extends.

The upper member 2 of the hinge is provided with a central boss 16 through which the screw 3 extends against which a plate 17 rests. Said plate 17 along its outer edge also rests upon an annular shoulder 18 being held in place by any suitable fastening means desirably rivets 19. Said plate 17 need not be resilient. It is provided with a circularly arranged series of seats or openings 21 greater in number but less in diameter than the openings 11 which come directly opposite. In the embodiment of the invention illustrated in the drawings there are shown 3 times as many of the openings 21 as there are of the openings 11. The openings of each series are equally spaced from each other and are concentric to the screw bolt 3 which forms the center of rotation for each section of the hinge.

From the upper section 1 of the hinge may extend a shank 22 and from the lower section 2 may extend a shank 23, said shanks being attached in any desired manner to the two members (not shown) secured together by the hinge.

In the lower hinge section 2 a lug 24 may project inwardly opposite each rivet 9 to thicken the annular shoulder 7 and make room for the opening for the rivet. Opposite each of said lugs 24 the spring washer 13 is provided with a recess 25 into which one of said lugs projects.

In operation, the screw bolt 3 is put in place and screwed down to the desired tightness, the antifriction balls 12 having been put in place between the containing openings 11 and the seats 21 formed respectively in the plates 8 and 17. There will however, be two of the seats 21 of the upper plate 17 between each of the balls. If now sufficient force be applied to the shanks 22 and 23 to rotate the upper and lower sections of the hinge with respect to each other, the ball opposite each seat 21 of the upper section will be forced out of such seat and will travel along the smooth portion of the disk or plate 17 until it reaches the next seat 21. Each ball will never leave its container opening 11 because it is too deeply seated therein, but it can be sprung out of its seat 21 because only a small part of the upper side of the ball rests in said seat 21.

By reason of the fact that the disk-shaped washer 13 extends completely around and underneath the series of balls, the pressure of the balls on one side of the washer counterbalances the pressure of the balls at the other side thereof, thus equalizing the wear upon said washer and tending to keep it more truly in place for effective service. It will therefore be seen that the spring portion of our hinge is rendered very simple in construction and effective in operation, and there is an avoidance of the requirement of making it any more complex, notwithstanding the fact that it is adapted to militate against a considerable number of movable bodies.

In Fig. 4 the spring disk 13 is shown perfectly flat throughout its central portion, but said disk may be uniformly dished from side to side.

We claim:

In a hinge, two relatively rotatable members, a post or bolt extending through said members, said post having a screw threaded engagement with one of said members and forming the sole means for securing said members together and for effecting the adjustment of the same with relation to their distance from each other, one of said members having a thickened central portion to form a bearing for the unthreaded portion of said post, and intermittently yielding stop means between said members, said post having a bearing collar or circumferential bead 6 engaging directly with the outer side of the member last mentioned, said intermittently yielding stop means comprising, in combination, a series of balls, a pair of plates having recesses to check the movements of said balls, and a spring washer having a continuous outer portion engaging said balls.

In testimony whereof we have hereto signed our names in the presence of two subscribing witnesses at Los Angeles, California, this 2nd day of November 1910.

WILLIAM J. OELLRICH.
RUDOLPH SMID.

Witnesses:
ALBERT H. MERRILL,
A. G. HINCKLEY.